(12) United States Patent
Chida

(10) Patent No.: US 7,193,657 B2
(45) Date of Patent: Mar. 20, 2007

(54) VIDEO SIGNAL PROCESSING APPARATUS AND INTEGRATED CIRCUIT

(75) Inventor: Kazunori Chida, Gunma (JP)

(73) Assignee: Sanyo Electric Co., Ltd., Osaka (JP)

(*) Notice: Subject to any disclaimer, the term of this patent is extended or adjusted under 35 U.S.C. 154(b) by 536 days.

(21) Appl. No.: 10/650,078

(22) Filed: Aug. 28, 2003

(65) Prior Publication Data
US 2004/0095508 A1    May 20, 2004

(30) Foreign Application Priority Data
Aug. 30, 2002    (JP)    ............................. 2002-253956

(51) Int. Cl.
*H04N 7/01* (2006.01)
*H04N 11/20* (2006.01)

(52) U.S. Cl. ...................... 348/458; 348/441; 348/501; 348/516; 348/524; 348/526; 348/581

(58) Field of Classification Search ................ 348/458, 348/441, 445, 446, 448, 581, 501, 524, 516, 348/526; H04N 7/01, 11/20
See application file for complete search history.

(56) References Cited

U.S. PATENT DOCUMENTS

| | | | |
|---|---|---|---|
| 5,365,274 A | 11/1994 | Seki et al. | |
| 6,177,922 B1* | 1/2001 | Schiefer et al. | 345/698 |
| 6,259,481 B1* | 7/2001 | Fimoff et al. | 348/456 |
| 6,317,159 B1* | 11/2001 | Aoyama | 348/458 |
| 6,339,601 B1* | 1/2002 | Seong et al. | 370/503 |
| 6,380,979 B1 | 4/2002 | Tokoi et al. | |
| 6,380,981 B1* | 4/2002 | Kasezawa et al. | 348/515 |
| 6,466,272 B1* | 10/2002 | Arai et al. | 348/555 |
| 6,507,346 B1* | 1/2003 | Otera | 345/606 |
| 6,587,120 B2* | 7/2003 | Kasai et al. | 345/698 |
| 6,636,269 B1* | 10/2003 | Baldwin | 348/500 |
| 6,831,700 B2* | 12/2004 | Hoshikawa | 348/446 |
| 6,876,395 B1* | 4/2005 | Muto et al. | 348/441 |
| 6,891,572 B2* | 5/2005 | Ueki | 348/458 |
| 6,917,388 B2* | 7/2005 | Naka et al. | 348/537 |

* cited by examiner

*Primary Examiner*—Brian P. Yenke
(74) *Attorney, Agent, or Firm*—Fish & Richardson, P.C.

(57) ABSTRACT

Disclosed is a video signal processing apparatus comprising a plurality of line memories to which in sequence input video signal data is written on a line-by-line basis; a timing controller for controlling a timing to write video signal data to the plurality of line memories and a timing to read video signal data from the plurality of line memories; a computation output portion for computing video signal data read from the plurality of line memories and outputting video signal data differing in resolution which is determined by a pixel count in the horizontal direction and a line count in the vertical direction; and a line controller which vary the pixel count in specified lines of video signal data obtained from the computation output portion, depending on a conversion rate of the video signal data resolution.

11 Claims, 4 Drawing Sheets

VIDEO SIGNAL PROCESSING APPARATUS AND INTEGRATED CIRCUIT

CROSS-REFERENCE TO RELATED APPLICATIONS

This application claims priority upon Japanese Patent Application No. 2002-253956 filed on Aug. 30, 2002 in Japan, which is herein incorporated by reference.

BACKGROUND OF THE INVENTION

1. Field of the Invention

The present invention relates to a video signal processing apparatus and an integrated circuit for outputting video signal data differing in resolution from input video signal data.

2. Description of Related Arts

Video signal data has a resolution determined by a pixel count in the horizontal direction and a line count in the vertical direction. The resolution of video signal data varies depending on video equipment (e.g., TV receiver, LCD or PC monitor). For this reason, video equipment incorporates a capability for converting the resolution of input video signal data as appropriate if the equipment requires video signal data which differs in resolution from input video signal data.

The capability for converting the resolution of input video signal data as appropriate can be implemented by using a field memory or a plurality of line memories.

An approach using a field memory consists in converting the resolution by writing one screenful of video signal data to the field memory at an as-is timing, reading one screenful of video signal data from the field memory at a timing different from that for writing data and performing computation for increasing or reducing the line count of video signal data as appropriate. However, this approach requires the field memory to store all the screenful of video signal data together, requiring a large-capacity memory and therefore resulting in a larger video signal processing apparatus and increased cost.

On the other hand, an approach using a plurality of line memories consists in converting the resolution by sequentially writing video signal data line by line to a plurality of line memories at an as-is timing, reading video signal data line by line from a plurality of line memories at a timing different from that for writing data and performing computation for increasing or reducing the line count of video signal data as appropriate. However, horizontal frequency for writing to individual line memories differs from that for reading from individual line memories in this approach. Additionally, the maximum time difference between writing to and reading from individual line memories is only several lines long. Therefore, timing control for writing to and reading from individual line memories requires correspondingly high accuracy, thus resulting in complex control. For example, if line memory write and read timings are reversed as a result of slight change in these timings, the screen image becomes disturbed due to loss of continuity.

For this reason, the following techniques have been proposed for preventing a reversal of line memory write and read timings.

<<Related Technique 1>>

A method for determining the pixel count in the horizontal direction of video signal data on the output side by counting a horizontal period of video signal data on the input side with a video signal data read clock on the output side, performing a specified computation for the count and the conversion rate of the resolution of video signal data in the vertical direction. This method is designed to prevent a reversal of line memory write and read timings by letting the pixel count in the horizontal direction of video signal data on the output side be uniquely related to the pixel count in the horizontal direction of video signal data on the input side.

<<Related Technique 2>>

A method for determining the video signal data read clock on the output side based on the conversion rate of the resolution in the vertical direction of video signal data by using a fixed pixel count in the horizontal direction of video signal data on the output side and configuring a PLL (Phase Locked Loop) which uses the horizontal frequency of video signal data on the input side as its reference frequency. This method is designed to prevent a reversal of line memory write and read timings by bringing the horizontal frequency of video signal data on the input side into synchronization with the video signal data read clock on the output side.

<<Related Technique 3>>

A method in which the horizontal frequency of video signal data on the input side in the related technique 2 is replaced with the vertical frequency. This method is designed to prevent a reversal of line memory write and read timings by bringing the vertical frequency of video signal data on the input side into synchronization with the video signal data read clock on the output side, that is, by bringing the horizontal frequency of video signal data on the input side substantially into synchronization with the video signal data read clock on the output side.

In the related technique 1, however, since the horizontal frequency of video signal data on the input side is not in synchronization with the video signal data read clock on the output side, the pixel count in the horizontal direction of video signal data on the output side has an error, possibly resulting in a reversal of line memory write and read timings.

In the related technique 2, the PLL does not function in the absence of the horizontal frequency of video signal data on the input side, thus making it impossible to obtain the video signal data read clock on the output side. For this reason, if no video signal data is available on the input side, means must be provided to supply a pseudo frequency equivalent to the horizontal frequency to the PLL, possibly resulting in complex control for the video signal processing apparatus.

In the related technique 3, the vertical frequency of video signal data on the input side is low for use as the PLL's reference frequency, possibly making it difficult to configure the PLL itself. In addition, the related technique 3 has the same problems as the related technique 2.

SUMMARY OF THE INVENTION

In order to solve the above and other problems, according to one aspect of the present invention there is provided a video signal processing apparatus comprising a plurality of line memories to which in sequence input video signal data is written on a line-by-line basis; a timing controller for controlling a timing to write video signal data to the plurality of line memories and a timing to read video signal data from the plurality of line memories; a computation output portion for computing video signal data read from the plurality of line memories and outputting video signal data differing in resolution which is determined by a pixel count in the horizontal direction and a line count in the vertical direction; and a line controller which varies the pixel count in specified lines of video signal data obtained from the computation output portion, depending on a conversion rate of the video signal data resolution.

According to another aspect of the present invention, it is provided a method of processing video signal comprising writing in sequence input video signal data to a plurality of line memories on a line-by-line basis; controlling a timing to write video signal data to the plurality of line memories and a timing to read video signal data from the plurality of line memories; computing video signal data read from the plurality of line memories and outputting video signal data differing in resolution which is determined by a pixel count in the horizontal direction and a line count in the vertical direction; and varying the pixel count in specified lines of video signal data depending on a conversion rate of the video signal data resolution.

Other features than the above of the present invention will become apparent from the descriptions of this specification and the accompanying drawings.

DETAILED DESCRIPTION OF THE INVENTION

Outline of Disclosure

Figure 1:
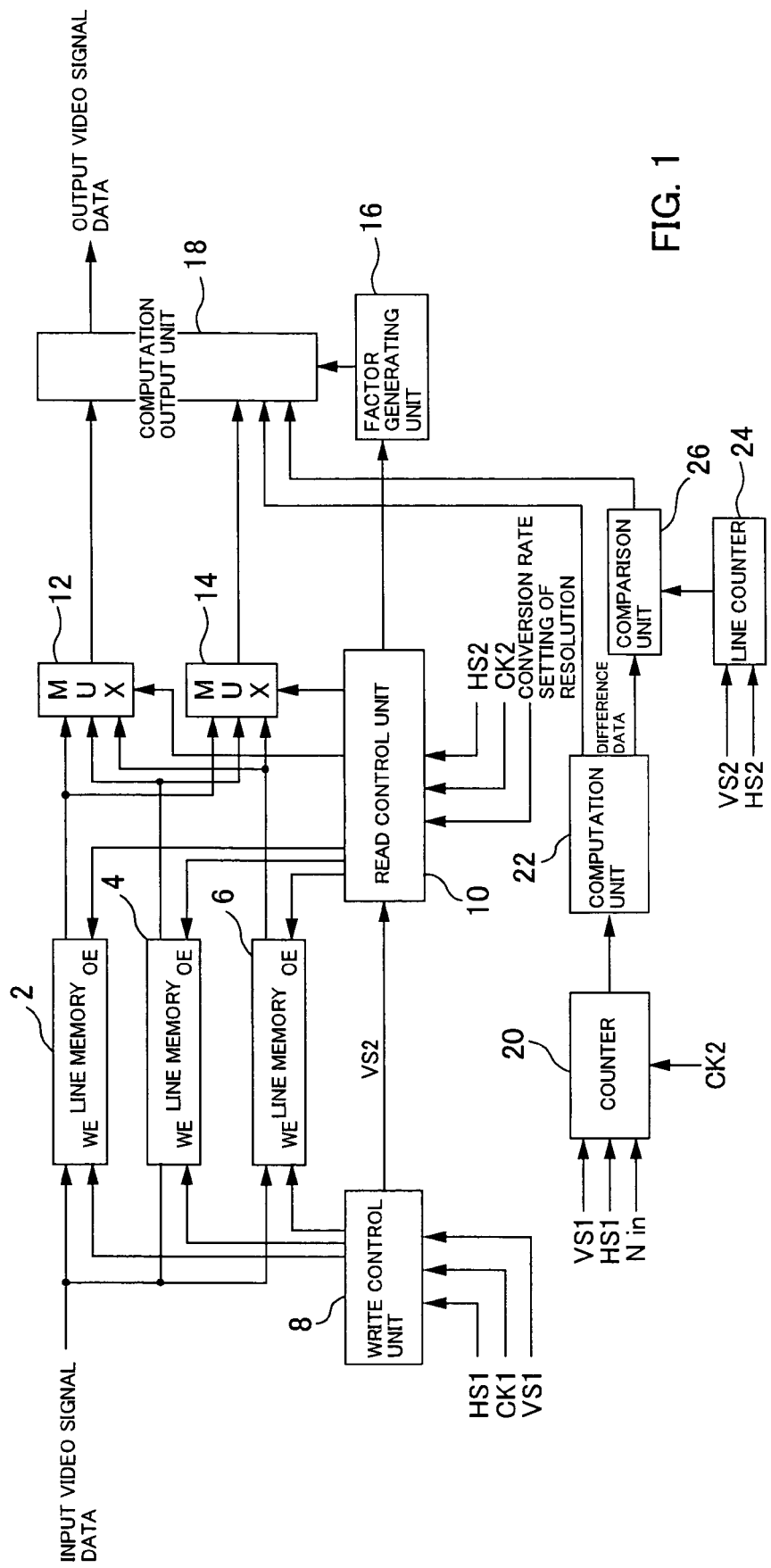
FIG. 1 is a block diagram showing the overall configuration of a video signal processing apparatus of the present invention.

At least the following features will become apparent from the descriptions of this specification and the accompanying drawings.

A video signal processing apparatus comprises a plurality of line memories to which in sequence input video signal data is written on a line-by-line basis; a timing controller for controlling a timing to write video signal data to the plurality of line memories and a timing to read video signal data from the plurality of line memories; and computation output portion for computing video signal data read from the plurality of line memories and outputting video signal data differing in resolution which is determined by a pixel count in the horizontal direction and a line count in the vertical direction; and a line controller which varies the pixel count in specified lines of video signal data obtained from the computation output portion, depending on a conversion rate of the video signal data resolution.

According to the video signal processing apparatus, since the pixel count can be varied in the specified lines of video signal data obtained from the computation output portion according to the conversion rate of the video signal data resolution, data is written to and read from a plurality of line memories at a predetermined sequence, thus making it possible to effectively prevent disturbance of the screen image.

The line controller may include a reference pixel count decision unit which decides a reference pixel count in the horizontal direction of video signal data obtained from the computation output portion, based on an elapsed period of time for a specified number of lines of input video signal data and on a line count corresponding to the specified number of lines of video signal data obtained from the computation output portion; and a pixel count variation unit which varies from the reference pixel count the pixel count in the specified lines of video signal data obtained from the computation output portion, depending on the conversion rate of the video signal data resolution.

The line controller may include a reference pixel count decision unit which decides the reference pixel count in the horizontal direction of video signal data obtained from the computation output portion, by letting a difference be smaller than a specified period of time, the difference being a difference between elapsed period of time for a specified number of lines of input video signal data and elapsed period of time for the line count corresponding to the specified number of lines of video signal data obtained from the computation output portion; a counting unit which counts the specified period of time; and a pixel count variation unit which varies from the reference pixel count the pixel count in the horizontal direction of video signal data obtained from the computation output portion if the count of the counting unit is equal to or smaller than the difference.

According to the above features, an optimal reference pixel count is determined in the horizontal direction of video signal data obtained from the computation output portion according to the conversion rate of the video signal data resolution, and the pixel count can be varied in the specified lines of video signal data using the reference pixel count, thus ensuring that data is effectively written to and read from the plurality of line memories at a predetermined sequence.

The reference pixel count decision unit may decide the reference pixel count during vertical blanking interval of input video signal data, and wherein the pixel count variation unit then uses the reference pixel count for video signal data to be obtained from the computation output portion.

According to the above feature, the reference pixel count is determined during blanking interval of input video signal data, thus making it possible to quickly obtain video signal data with converted resolution from the computation output portion.

The plurality of line memories may include at least three line memories, and wherein, while video signal data is written to one of the line memories, video signal data is read from the other line memories.

According to the above feature, video signal data with converted resolution can be obtained from the computation output portion using a minimum number of line memories.

A method of processing video signal comprises writing in sequence input video signal data to a plurality of line memories on a line-by-line basis; controlling a timing to write video signal data to the plurality of line memories and a timing to read video signal data from the plurality of line memories; computing video signal data read from the plurality of line memories and outputting video signal data differing in resolution which is determined by a pixel count in the horizontal direction and a line count in the vertical direction; and varying the pixel count in specified lines of video signal data depending on a conversion rate of the video signal data resolution.

The method may further comprise deciding a reference pixel count in the horizontal direction of video signal data based on an elapsed period of time for a specified number of lines of input video signal data and on a line count corresponding to the specified number of lines of video signal data; and varying from the reference pixel count the pixel count in the specified lines of video signal data depending on the conversion rate of the video signal data resolution.

The method may further comprise deciding the reference pixel count in the horizontal direction of video signal data, by letting a difference be smaller than a specified period of time, the difference being a difference in elapsed period of time for a specified number of lines of input video signal data and elapsed period of time for the line count corresponding to the specified number of lines of the computed video signal data; counting the specified period of time; and varying from the reference pixel count the pixel count in the horizontal direction of the computed video signal data if the count is equal to or smaller than the difference.

The method may further comprise deciding the reference pixel count during vertical blanking interval of input video signal data, and using the reference pixel count for the computed video signal data.

The plurality of line memories may include at least three line memories, and wherein, while video signal data is written to one of the line memories, video signal data is read from the other line memories.

Overall Configuration of Video Signal Processing Apparatus

The overall configuration of the video signal processing apparatus of the present invention will be described with reference to FIG. 1. FIG. 1 illustrates a block diagram of the overall configuration of the video signal processing apparatus of the present invention. Video signal data, input to and output from the video signal processing apparatus of the present invention, is digital data in which each line in the horizontal direction is comprised of a specified number of pixels arranged continuously, with a specified number of lines arranged continuously in the vertical direction. Note that pixel data making up each line is dot data of the RGB trichromatic system.

In FIG. 1, line-by-line video signal data is sequentially and repeatedly written to line memories 2, 4 and 6 (a plurality of line memories) and read at a predetermined sequence. Each of the line memories 2, 4 and 6 has a write enable terminal WE for write-enabling the memory and an output enable terminal OE for read-enabling the memory. Note that using a storage device which can be written to and read from anytime (e.g., DRAM) is preferable.

A write control unit 8 controls timings for writing video signal data to the line memories 2, 4 and 6. The write control unit 8 is supplied with an input clock CK1 which is in synchronization with a pixel period of input video signal data, a horizontal synchronizing signal HS1 for input video signal data and a signal VS1 for starting write which corresponds to a vertical synchronizing signal for input video signal data. The write control unit 8 sequentially and repeatedly supplies a write enable signal to the write enable terminals WE of the line memories 2, 4 and 6 to write-enable the line memories according to the input clock CK1, the horizontal synchronizing signal HS1 and the signal VS1. This allows for line-by-line video signal data to be sequentially and repeatedly written to the line memories 2, 4 and 6. Note that the input clock CK1 may be obtained either from free-running oscillation or non-free-running oscillation.

A read control unit 10 controls timings for reading video signal data from the line memories 2, 4 and 6. The read control unit 10 is supplied with an output clock CK2 which is in synchronization with a pixel period of output video signal data, a horizontal synchronizing signal HS2 for output video signal data and a conversion rate setting of the resolution between output video signal data and input video signal data. Further, the write control unit 8 supplies the read control unit 10 with a signal VS2 for starting read. The read control unit 10 supplies an output enable signal to the output enable terminals OE of the line memories 2, 4 and 6 as appropriate to read-enable the line memories according to the output clock CK2, the horizontal synchronizing signal HS2, the conversion rate setting of the resolution and the signal VS2. This allows for line-by-line video signal data to be read from the line memories 2, 4 and 6 at a sequence responsive to the conversion rate of the resolution. Note that the output clock CK2 may be obtained either from free-running oscillation or non-free-running oscillation. The write control unit 8 and the read control unit 10 correspond to the timing controller described in the claims.

Multiplexers 12 and 14 are supplied with all video signal data read from the line memories 2, 4 and 6 and output appropriate video signal data by a switching signal responsive to the resolution conversion rate output by the read control unit 10.

A factor generating unit 16 generates a conversion factor for converting input video signal data at a specified resolution by a signal responsive to the resolution conversion rate output by the read control unit 10.

A computation output unit 18 is supplied with video signal data output by the multiplexers 12 and 14 and uses the conversion factor obtained from the factor generating unit 16 to perform computations as appropriate including line count interpolation. This allows for video signal data with converted resolution, that is, video signal data having pixel count and line count responsive to the resolution conversion rate in both the horizontal and vertical directions to be output from the computation output unit 18. Note that the computation output portion described in the claims are comprised of the multiplexers 12 and 14, the factor generating unit 16 and the computation output unit 18.

A counter 20 is reset by the signal VS1 which corresponds to the vertical synchronizing signal for input video signal data and counts an elapsed period of time for the horizontal synchronizing signal HS1 equal to a line count Nin of output video signal data with the output clock CK2 which is in synchronization with the pixel period of output video signal data.

A computation unit 22 is supplied with the count of the counter 20 and performs computations characteristic of the features of the present invention for preventing a reversal of writing to and reading from the line memories 2, 4 and 6.

The computation unit 22 determines "Houtdot" such that a calculation formula "Hindot*Nin−Houtdot*256", made available in advance, yields a positive integer of 256 or less. Note that "Hindot*Nin" is the count of the counter 20 and represents the elapsed period of time when the Nin lines of video signal data are input. "Houtdot" represents the reference pixel count in the horizontal direction of output video signal data while "256" is a fixed line count after conversion which corresponds to the Nin line count of output video signal data. "Houtdot*256" represents the elapsed period of time when 256 lines of video signal data are output. As a result, "Hindot*Nin−Houtdot*256" represents the difference in elapsed period of time between when Nin lines of video signal data are input and when 256 lines of video signal data are output. The fixed line count of output video signal data is not limited to "256" and may be determined as appropriate according to total line count in the vertical direction of output video signal data. Since "Hindot*Nin" is counted by the output clock CK2, it is preferable that "Hindot*Nin-Houtdot*256" becomes zero. However, there is a possibility that "Hindot", which gives zero as the result of "Hindot*Nin-Houtdot*256", does not exist depending on the resolution conversion rate. For this reason, the computation unit 22 performs the above computation. Note that the reference pixel count decision unit described in the claims is comprised of the computation unit 22.

A line counter 24, reset by the signal VS2 for starting read, that is, the vertical synchronizing signal for output video signal data, cyclically counts the horizontal synchronizing signal HS2 for output video signal data to 256. Note that the counting unit described in the claims is comprised of the line counter 24.

A comparison unit 26 compares "Hindot*Nin-Houtdot*256" obtained from the computation unit 22 with the count of the line counter 24. The comparison unit 26 supplies a control signal to the computation output unit 18, the control signal for letting the pixel count of the lines which are equal to the count of the line counter 24 for output video signal data, be "the reference pixel count+1" if the count of the line counter 24 is equal to or smaller than "Hindot*Nin-Houtdot*256." On the other hand, the comparison unit 26 supplies a control signal to the computation output unit 18, the control signal for letting the pixel count of the lines which are equal to the count of the line counter 24 for output video signal data, be "the same as the reference pixel count" if the count of the line counter 24 exceeds "Hindot*Nin-Houtdot*256." Note that the pixel count variation unit described in the claims is comprised of the computation output unit 18 and the comparison unit 26.

Operation of Video Signal Processing Apparatus

Figure 2:
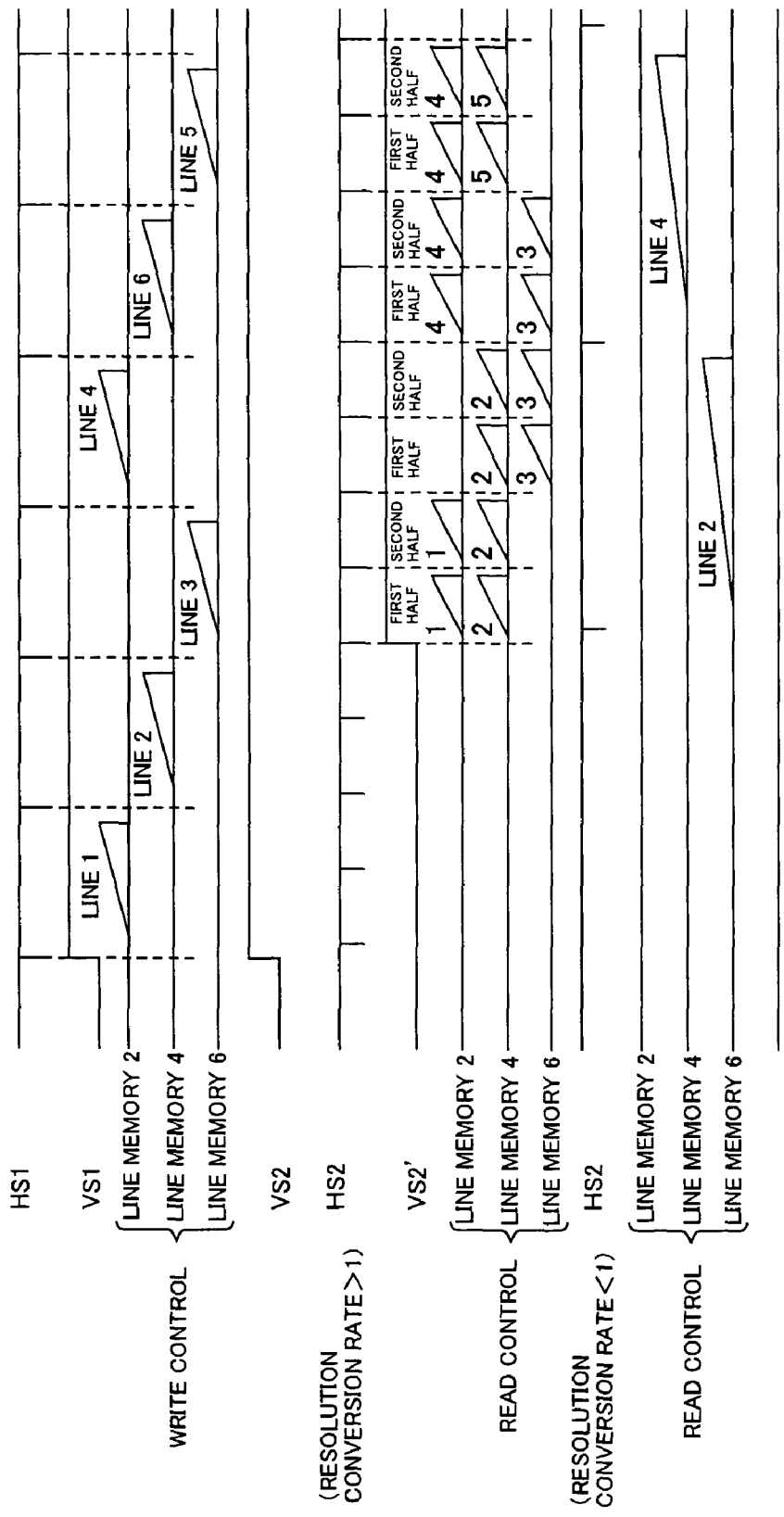
FIG. 2 is a time diagram explaining the relationship between writing to and reading from a plurality of line memories in the video signal processing apparatus of the present invention.
Figure 3:
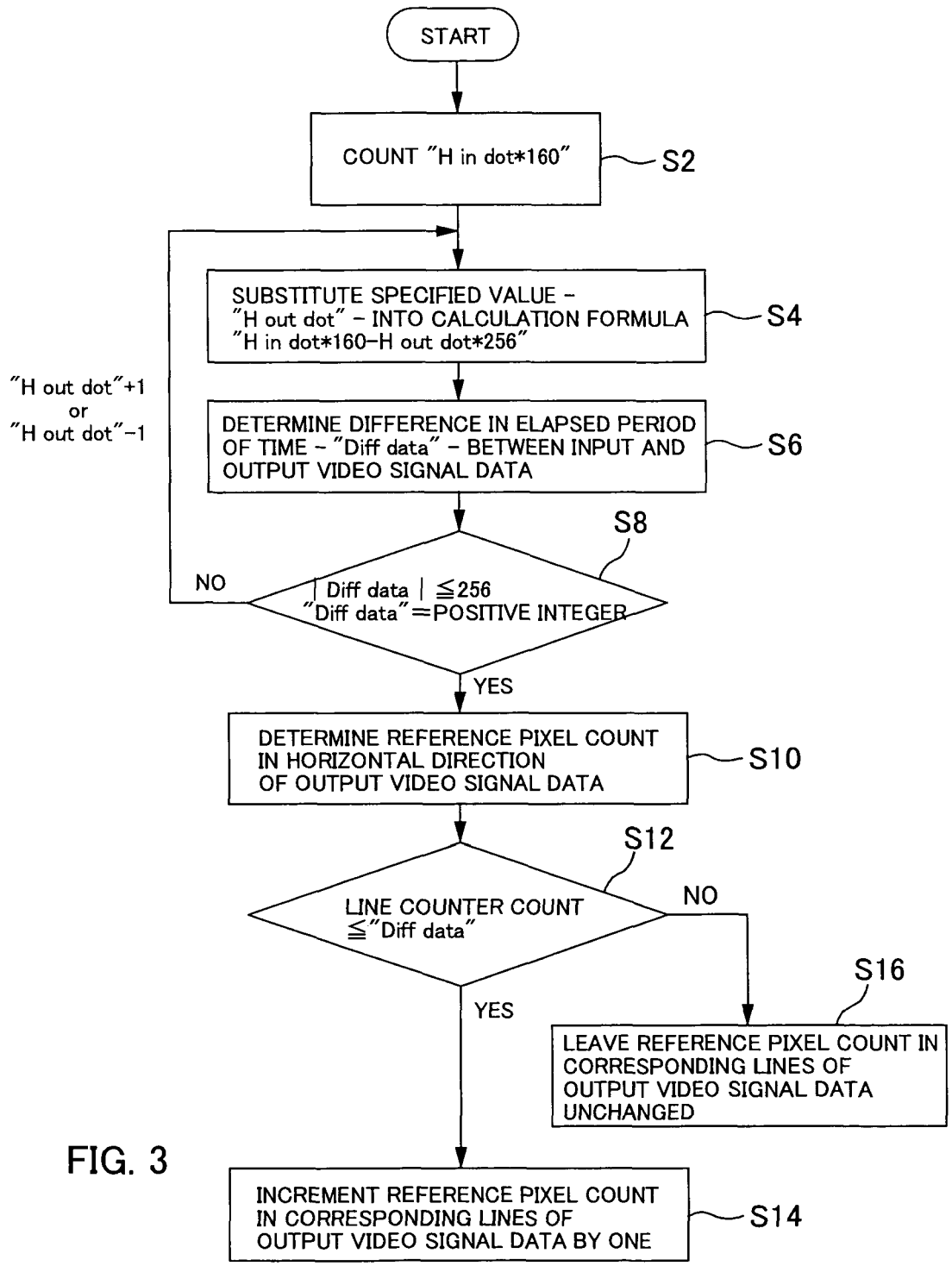
FIG. 3 is a flowchart explaining the prevention of a reversal of writing to and reading from the plurality of line memories in the video signal processing apparatus of the present invention.
Figure 4:
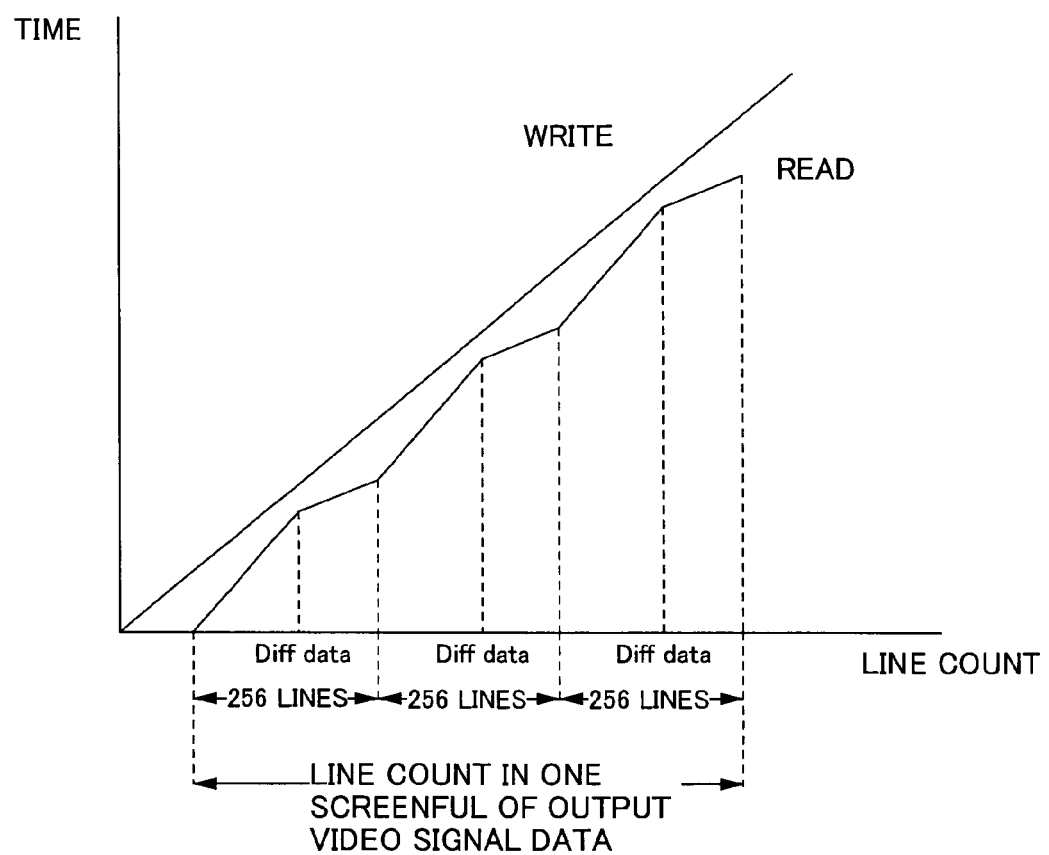
FIG. 4 is a diagram for comprehension of the prevention of a reversal of writing to and reading from the plurality of line memories in the video signal processing apparatus of the present invention.

The operation of the video signal processing apparatus of the present invention will be described with reference to FIGS. 2, 3 and 4. FIG. 2 illustrates a time diagram for describing the relationship between writing to and reading from a plurality of line memories of the video signal processing apparatus of the present invention. In particular, "Resolution conversion rate >1" is a timing chart where the line count of output video signal data is larger than that of input video signal data. On the other hand, "Resolution conversion rate <1" is a time diagram where the line count of output video signal data is smaller than that of input video signal data. Note that the vertical frequencies of one screenful of input and output video signal data are the same. FIG. 3 illustrates a flowchart explaining the prevention of reversal of writing to and reading from the plurality of line memories in the video signal processing apparatus of the present invention. FIG. 4 illustrates a drawing for understanding the prevention of reversal of writing to and reading from the plurality of line memories in the video signal processing apparatus of the present invention, with the horizontal axis and the vertical axis representing line count and time, respectively.

<<Write Control>>

The write control unit 8 is supplied with the input clock CK1, the horizontal synchronizing signal HS1 and the signal VS1 which corresponds to the vertical synchronizing signal. Note that the horizontal synchronizing signal HS1 is a pulse which goes low at the start point of each line of input video signal data. The signal VS1 is a signal which goes high in synchronization with the horizontal synchronizing signal HS1 from the start point of line 1 of input video signal data and remains high until the end point of the effective lines in the field. The write control unit 8 sequentially and repeatedly outputs the write enable signal to write-enable the line memories 2, 4 and 6 when the horizontal synchronizing signal HS1 occurs during the period where the signal VS1 remains high. This allows for the write enable signal to be supplied from the write control unit 8 to the write enable terminals WE of the line memories 2, 4 and 6 and allows for each line of input video signal data to be sequentially and repeatedly written to the line memories 2, 4 and 6 in synchronization with the input clock CK1. More specifically, data is cyclically written to the line memories 2, 4 and 6 three lines in rotation—the same number as the number of the line memories available. That is, input video signal data, comprised of 3N+line 1, 3N+line 2 and 3N+line 3 (N=0), is written to the line memories 2, 4 and 6.

The write control unit 8 pulls the signal VS2 high in synchronization with the third horizontal synchronizing signal HS1 in each field of input video signal data and supplies the signal to the read control unit 10. The reason for this is that since writing of the first data to the line memories 2 and 4 is complete, it is possible to start generating video signal data lines to be output according to the resolution conversion rate by using the data written to the line memories 2 and 4.

<<Read control>>

The read control unit 10 is supplied with the output clock CK2 which corresponds to the resolution conversion rate, the horizontal synchronizing signal HS2 and the signal VS2. Note that the horizontal synchronizing signal HS2 is a pulse which goes low at the start point of each line of input video signal data. The read control unit 10 generates a signal VS2' which goes high in synchronization with the horizontal synchronizing signal HS2 immediately after low-to-high transition of the signal VS2. The read control unit 10 outputs the output enable signal to simultaneously or selectively read-enable the line memories which are not being written to when the horizontal synchronizing signal HS2 occurs during the period where the signal VS2, remains high. This allows for line data, used as a basis for output video signal data, to be simultaneously or selectively read from the line memories which are not being written to in synchronization with the input clock CK2. More specifically, if the resolution conversion rate is greater than 1, while one of the line memories is being written to, line data, the basis for output video signal data, is simultaneously and repeatedly read from the other two line memories. On the other hand, if the resolution conversion rate is smaller than 1, line data, the basis for output video signal data, is read from one of the line memories over the continuous period during which the other two line memories are written to.

Video signal data from the line memories 2, 4 and 6 is supplied to the computation output unit 18 via the multiplexers 12 and 14.

The computation output unit 18 performs computations as appropriate including line count interpolation using a conversion factor obtained from the factor generating unit 16 on video signal data supplied from the multiplexers 12 and 14.

For instance, if the resolution conversion rate is 2, while one of the line memories (e.g., the line memory 6) is written to, line data, the basis for output video signal data, is simultaneously read from the other line memories (e.g., the line memories 2 and 4) repeated twice. The conversion factor obtained from the factor generating unit 16 is assigned weights of (1, 0) and (0.5, 0.5) respectively in the first and second halves of the simultaneous line data read operation from the other two line memories which is repeated twice.

That is, either of the two pieces of line data is output as is from the computation output unit 18 in the first half of the read operation while the average of the two pieces of line data is output in the second half of the read operation. This allows for two lines of output video signal data to be generated from a single line of input video signal data.

The pixel count in the horizontal direction of output video signal data can be changed by repeating or thinning out specified pixels in the horizontal direction of input video signal data a specified number of times.

<<Control for preventing a reversal of writing to and reading from the line memories>>

Control shown in FIG. 3 is conducted to prevent a reversal of writing to and reading from the line memories 2, 4 and 6. For convenience of description, the line count of input video signal data is assumed to be 480 while that for output video signal data 768 (1.6 times input video signal data's line count) per screen. This results in the resolution conversion rate of 1.6 and Nin=256/1.6=160.

First, the counter 20 is reset by the signal VS1 which corresponds to the vertical synchronizing signal for input video signal data and then counts the output clock CK2 which is in synchronization with the pixel period of output video signal data until the horizontal synchronizing signal HS1—160 lines worth of input video signal data—elapses. The count of the counter 20 is supplied to the computation unit 22 as "Hindot*160" (S2).

The computation unit 22 substitutes a specified value as "Houtdot" into the calculation formula "Hindot*160-Houtdot*256" to determine "Houtdot" which makes the calculation formula yield a positive integer of 256 or less. Note that the initial value of "Houtdot" is assumed to be a predetermined value (S4).

The computation unit 22 computes "Hindot*160-Houtdot*256" to determine the difference in elapsed period of time between input and output video signal data as "Diffdata" (S6).

The computation unit 22 judges whether "Diffdata" is a positive integer equal to or smaller than 256 (S8).

If the computation unit 22 judges "Diffdata" as not being a positive integer equal to or smaller than 256 (S8: NO) and if "Diffdata" is a positive integer greater than 256, the computation unit 22 increments "Houtdot" by one and performs the steps S4 onward again. If "Diffdata" is a negative integer, the computation unit 22 decrements "Houtdot" by one and performs the steps S4 onward again. When the steps S4 to S8 are performed as appropriate, "Houtdot" is determined as the reference pixel count in the horizontal direction of output video signal data, "Houtdot" which satisfies the condition in which "Hindot*160" is greater than "Houtdot*256" only for the elapsed period of time for up to 256 pixels.

On the other hand, when the computation unit 22 judges "Diffdata" as being a positive integer of 256 or less (S8: YES), "Houtdot" is determined as the reference pixel count in the horizontal direction of video signal data. Then, "Houtdot" obtained from the computation unit 22 is supplied to the computation output unit 18 as the reference pixel count. "Diffdata" obtained from the computation unit 22 is supplied to the comparison unit 26 (S10). Note that the above reference pixel count is determined during vertical blanking interval of input video signal data and used for output video signal data in the next field.

The comparison unit 26 judges whether the count of the line counter 24 is equal to or smaller than "Diffdata" obtained from the computation unit 22 (S12).

When the comparison unit 26 judges the count of the line counter 24 as being equal to or smaller than "Diffdata" (S12: YES), the comparison unit 26 supplies a control signal to the computation output unit 18, the control signal for letting the pixel count of the lines which are equal to the count of the line counter 24 for output video signal data be "the reference pixel count+1." As a result, the computation output unit 18 lets the pixel count of the line, equal to the count of the line counter 24 for output video signal data, be "the reference pixel count+1" (S14).

On the other hand, if the comparison unit 26 judges the count of the line counter 24 as not being equal to or smaller than "Diffdata" (S12: NO), the comparison unit 26 supplies a control signal to the computation output unit 18, the control signal for letting the pixel count of the lines which are equal to the count of the line counter 24 for output video signal data be "the same as the reference pixel count." As a result, the computation output unit 18 lets the pixel count of the line, equal to the count of the line counter 24 for output video signal data, be "the same as the reference pixel count" (S16).

"Diffdata" is assumed, for example, to be 100. With the line count in each piece of output video signal data being 256, the first 100 lines of the 256 lines are let to be "the reference pixel count+1" while the remaining 156 lines "the same as the reference pixel count", thus preventing a reversal of writing to and reading from the line memories 2, 4 and 6.

In FIG. 4, the straight line represents the write timing to the line memories 2, 4 and 6 while the staggered line the read timing from the line memories 2, 4 and 6. The pixel count in the horizontal direction of output video signal data changes at "Diffdata"—"the reference pixel count+1" before and "the same as the reference pixel count" after "Diffdata." That is, the read time from the line memories 2, 4 and 6 is longer by one pixel before "Diffdata" than after "Diffdata". In other word, the slope of the staggered line is steeper than that of the straight line before "Diffdata" and less steep after "Diffdata." This ensures that the straight line and the staggered line do not intersect each other, thus preventing a reversal of writing to and reading from the line memories 2, 4 and 6. Processing of video signal data on the output side as appropriate allows for images with continuity to be obtained.

As described above, application of the video signal processing apparatus of the present invention makes it possible, without using PLL, to reliably prevent a reversal of writing to and reading from the line memories 2, 4 and 6 including writing preceding reading or reading preceding writing. Note that while the video signal processing apparatus of the present invention can be configured with integrated circuit or discrete circuit, use of integrated circuit will enable downsizing of video equipment using the video signal processing apparatus and cost reduction.

OTHER EMBODIMENTS

While the video signal processing apparatus of the present invention was described above based on one embodiment, the embodiment is for easier comprehension of the present invention only and does not restrict the present invention. Changes and modifications may be made to the present invention without departure from the spirit thereof, and the present invention naturally includes equivalents thereof.

<<Change in Reference Pixel Count>>

In the present embodiment, the pixel count in the horizontal direction of output video signal data is changed to "the reference pixel count+1" according to the count of the line counter 24. However, the change in reference pixel count is not limited to this number. For instance, the computation unit 22, the line counter 24 and the comparison unit 26 may be controlled such that the pixel count in the horizontal direction of output video signal data changes by "+2 or more" or "−1 or less."

<<Line Memory Count>>

In the present embodiment, three line memories (minimum) are used. However, the line memory count is not limited to this number. That is, reversal of line memory write and read timings may be further reliably prevented by using four or more line memories.

<<Resolution Conversion Rate>>

While the conversion rate of the video signal data resolution is 1.6 in the present embodiment, other conversion rate, 1 or more or less than 1, may also be used.

According to the present invention, reversal of writing to and reading from a plurality of line memories can be prevented during conversion of the video signal data resolution, thus effectively preventing disturbance of the screen image.

While illustrative and presently preferred embodiments of the present invention have been described in detail herein, it is to be understood that the inventive concepts may be otherwise variously embodied and employed and that the appended claims are intended to be construed to include such variations except insofar as limited by the prior art.

What is claimed is:

1. A video signal processing apparatus comprising:
   a plurality of line memories to which in sequence video signal data inputted is written on a line-by-line basis;
   a timing controller for controlling a timing to write the video signal data to the plurality of line memories and a timing to read the video signal data from the plurality of line memories;
   a computation output portion for computing the video signal data read from the plurality of line memories and outputting video signal data differing in resolution which is determined by a pixel count in the horizontal direction and a line count in the vertical direction;
   a reference pixel count decision unit which decides a reference pixel count in the horizontal direction of the video signal data obtained from the computation output portion, by letting a difference be a specified period of time which is determined depending on a conversion rate of the resolution of the video signal data, wherein the difference is a difference between an elapsed period of time for a specified number of lines of the video signal data inputted and an elapsed period of time for a line count corresponding to the specified number of lines of the video signal data obtained from the computation output portion;
   a counting unit which counts the specified period of time; and
   a pixel count variation unit which varies from the reference pixel count the pixel count in the horizontal direction of the video signal data obtained from the computation output portion if the count of the counting unit is equal to or smaller than the specified period of time.

2. A video signal processing apparatus according to claim 1, wherein the pixel count variation unit provides the pixel count in the horizontal direction of the video signal data obtained from the computation output portion, with a certain number increase over the reference pixel count, if the count of the counting unit is equal to or smaller than the specified period of time.

3. A video signal processing apparatus according to claim 2, wherein the pixel count variation unit varies the pixel count in units of the certain number smaller than that of one screen-full of lines in the vertical direction of the video signal data obtained from the computation output portion.

4. A video signal processing apparatus according to claim 3, wherein the reference pixel count decision unit is operable to decide the reference pixel count during vertical blanking interval of the video signal data inputted, and wherein the pixel count variation unit is operable to use the reference pixel count for the video signal data to be obtained from the computation output portion.

5. A video signal processing apparatus according to claim 1, wherein the plurality of line memories include at least three line memories, and wherein, while the video signal data is written to a first line memory, the video signal data is read from a second and third line memory.

6. An integrated circuit comprising the video signal processing apparatus according to claim 1.

7. A method of processing a video signal for a video signal processing apparatus which comprises a plurality of line memories to which in sequence video signal data inputted is written on a line-by-line basis, a timing controller for controlling a timing to write the video signal data to the plurality of line memories and a timing to read the video signal data from the plurality of line memories, and a computation output portion for computing the video signal data read from the plurality of line memories and outputting video signal data differing in resolution which is determined by a pixel count in the horizontal direction and a line count in the vertical direction, the method of processing a video signal comprising:
   deciding a reference pixel count in the horizontal direction of the video signal data obtained from the computation output portion, by letting a difference be a specified period of time which is determined depending on a conversion rate of the resolution of the video signal data, wherein the difference is a difference between an elapsed period of time for a specified number of lines of the video signal data inputted and an elapsed period of time for a line count corresponding to the specified number of lines of the video signal data obtained from the computation output portion;
   counting the specified period of time; and
   varying from the reference pixel count the pixel count in the horizontal direction of the video signal data obtained from the computation output portion if the count is equal to or smaller than the specified period of time.

8. A method of processing a video signal according to claim 7, further comprising providing the pixel count in the horizontal direction of the video signal data obtained from the computation output portion, with a certain number increase over the reference pixel count, if the count is equal to or smaller than the specified period of time.

9. A method of processing a video signal according to claim 8, further comprising varying the pixel count in units of the number smaller than that of one screen-full of lines in the vertical direction of the video signal data obtained from the computation output portion.

10. A method of processing a video signal according to claim 9, further comprising:
  deciding the reference pixel count during vertical blanking interval of the video signal data inputted; and
  using the reference pixel count for the video signal data to be obtained from the computation output portion.

11. A method of processing a video signal according to claim 7, wherein the plurality of line memories include at least three line memories, and wherein, while the video signal data is written to a first line memory, the video signal data is read from a second and a third line memory.

* * * * *